(12) United States Patent
Jones et al.

(10) Patent No.: US 7,580,972 B2
(45) Date of Patent: Aug. 25, 2009

(54) METHOD AND SYSTEM FOR CONTROLLING BANDWIDTH ON CLIENT AND SERVER

(75) Inventors: Paul David Jones, Renton, WA (US); Christopher Richard Newcombe, Kirkland, WA (US); Richard Donald Ellis, Carnation, WA (US); Derrick Jason Birum, Duvall, WA (US)

(73) Assignee: Valve Corporation, Bellevue, WA (US)

( * ) Notice: Subject to any disclaimer, the term of this patent is extended or adjusted under 35 U.S.C. 154(b) by 564 days.

(21) Appl. No.: 10/317,851

(22) Filed: Dec. 11, 2002

(65) Prior Publication Data

US 2003/0177179 A1    Sep. 18, 2003

Related U.S. Application Data

(60) Provisional application No. 60/341,079, filed on Dec. 12, 2001.

(51) Int. Cl.
*G06F 15/16* (2006.01)

(52) U.S. Cl. .................. 709/203; 370/230; 370/468

(58) Field of Classification Search .............. 370/230, 370/412, 477, 351, 468, 254, 394; 709/224, 709/235, 217, 223, 226, 227; 726/14, 11
See application file for complete search history.

(56) References Cited

U.S. PATENT DOCUMENTS

| | | | |
|---|---|---|---|
| 4,310,720 A | 1/1982 | Check, Jr. | |
| 4,920,487 A | 4/1990 | Baffes | |
| 4,999,766 A | 3/1991 | Peters et al. | |
| 5,305,389 A | 4/1994 | Palmer | |
| 5,325,526 A | 6/1994 | Cameron et al. | |
| 5,343,526 A | 8/1994 | Lassers | |
| 5,349,643 A | 9/1994 | Cox et al. | |
| 5,495,533 A | 2/1996 | Linehan et al. | |
| 5,535,276 A | 7/1996 | Ganesan | |
| 5,606,693 A | 2/1997 | Nilsen et al. | |
| 5,613,089 A | 3/1997 | Hornbuckle | |
| 5,619,716 A | 4/1997 | Nonaka et al. | |

(Continued)

FOREIGN PATENT DOCUMENTS

EP    0841615    5/1998

(Continued)

OTHER PUBLICATIONS

International Preliminary Examining Authority, Written Opinion for PCT/US02/39975 dated May 31, 2008, 8 pages.

(Continued)

*Primary Examiner*—Dustin Nguyen
(74) *Attorney, Agent, or Firm*—Darby & Darby PC; John W. Branch

(57) ABSTRACT

A method and system for controlling bandwidth used to communicate between at least one client and a server. A history is accessed that includes information about communications between the at least one client and a server during a period of time. The history is employed to determine a send time at which a message could be sent without exceeding a bandwidth threshold. The bandwidth threshold indicates an upper limit for an amount of bandwidth allowed during a period of time to communicate between the at least one client and the server. A data structure is then modified to delay sending the message until at least the send time.

27 Claims, 7 Drawing Sheets

U.S. PATENT DOCUMENTS

| | | | |
|---|---|---|---|
| 5,634,107 A | 5/1997 | Yumoto et al. | |
| 5,732,275 A | 3/1998 | Kullick et al. | |
| 5,737,495 A | 4/1998 | Adams et al. | |
| 5,742,829 A | 4/1998 | Davis et al. | |
| 5,757,919 A | 5/1998 | Herbert et al. | |
| 5,764,992 A | 6/1998 | Kullick et al. | |
| 5,808,690 A | 9/1998 | Rich | |
| 5,819,082 A | 10/1998 | Marion | |
| 5,829,001 A | 10/1998 | Li et al. | |
| 5,835,601 A | 11/1998 | Shimbo et al. | |
| 5,850,535 A | 12/1998 | Maystrovsky et al. | |
| 5,862,339 A | 1/1999 | Bonnaure et al. | |
| 5,915,112 A | 6/1999 | Boutcher | |
| 5,924,094 A | 7/1999 | Sutter et al. | |
| 5,926,624 A | 7/1999 | Katz et al. | |
| 5,933,835 A | 8/1999 | Adams et al. | |
| 5,960,189 A | 9/1999 | Stupek, Jr. et al. | |
| 5,970,143 A | 10/1999 | Schneier | |
| 5,982,893 A | 11/1999 | Hughes | |
| 5,999,740 A | 12/1999 | Rowley | |
| 6,009,528 A | 12/1999 | Teraoka | |
| 6,018,717 A | 1/2000 | Lee et al. | |
| 6,029,175 A | 2/2000 | Chow et al. | |
| 6,105,074 A | 8/2000 | Yokote | |
| 6,119,203 A | 9/2000 | Snyder et al. | |
| 6,119,235 A * | 9/2000 | Vaid et al. | 726/11 |
| 6,122,372 A | 9/2000 | Hughes | |
| 6,122,657 A | 9/2000 | Hoffman, Jr. et al. | |
| 6,154,767 A | 11/2000 | Altschuler et al. | |
| 6,195,622 B1 | 2/2001 | Altschuler et al. | |
| 6,219,793 B1 | 4/2001 | Li et al. | |
| 6,223,166 B1 | 4/2001 | Kay | |
| 6,256,773 B1 | 7/2001 | Bowman-Amuah | |
| 6,269,400 B1 | 7/2001 | Douglas et al. | |
| 6,292,465 B1 * | 9/2001 | Vaid et al. | 370/230 |
| 6,292,889 B1 | 9/2001 | Fitzgerald et al. | |
| 6,314,409 B2 | 11/2001 | Schneck et al. | |
| 6,317,786 B1 * | 11/2001 | Yamane et al. | 709/224 |
| 6,324,578 B1 | 11/2001 | Cox et al. | |
| 6,332,198 B1 | 12/2001 | Simons et al. | |
| 6,338,072 B1 | 1/2002 | Durand et al. | |
| 6,351,775 B1 | 2/2002 | Yu | |
| 6,366,947 B1 | 4/2002 | Kavner | |
| 6,381,742 B2 | 4/2002 | Forbes et al. | |
| 6,397,258 B1 | 5/2002 | Tsuji et al. | |
| 6,430,608 B1 | 8/2002 | Shaio | |
| 6,438,141 B1 * | 8/2002 | Hanko et al. | 370/477 |
| 6,438,559 B1 | 8/2002 | White et al. | |
| 6,453,353 B1 | 9/2002 | Win et al. | |
| 6,466,979 B1 * | 10/2002 | Plouffe, Jr. | 709/226 |
| 6,473,793 B1 * | 10/2002 | Dillon et al. | 709/223 |
| 6,487,455 B1 | 11/2002 | Balasubramanian | |
| 6,505,255 B1 | 1/2003 | Akatsu et al. | |
| 6,578,054 B1 | 6/2003 | Hopmann et al. | |
| 6,578,102 B1 | 6/2003 | Batchelor et al. | |
| 6,584,568 B1 | 6/2003 | Dircks et al. | |
| 6,611,812 B2 | 8/2003 | Hurtado et al. | |
| 6,618,810 B1 | 9/2003 | Dirie | |
| 6,675,382 B1 | 1/2004 | Foster | |
| 6,678,700 B1 | 1/2004 | Moore et al. | |
| 6,684,396 B1 | 1/2004 | Brittain et al. | |
| 6,694,450 B1 | 2/2004 | Kidder et al. | |
| 6,697,378 B1 * | 2/2004 | Patel | 370/468 |
| 6,711,593 B1 | 3/2004 | Gordon et al. | |
| 6,718,549 B1 | 4/2004 | Narin et al. | |
| 6,721,786 B1 * | 4/2004 | Gordon et al. | 709/217 |
| 6,735,601 B1 | 5/2004 | Subrahmanyam | |
| 6,738,970 B1 | 5/2004 | Kruger et al. | |
| 6,748,470 B2 | 6/2004 | Goldick | |
| 6,751,608 B1 | 6/2004 | Cohen et al. | |
| 6,752,313 B1 | 6/2004 | Caviles et al. | |
| 6,754,821 B1 | 6/2004 | Berson et al. | |
| 6,766,428 B2 | 7/2004 | Saulsbury et al. | |
| 6,771,290 B1 | 8/2004 | Hoyle | |
| 6,775,704 B1 | 8/2004 | Watson et al. | |
| 6,795,435 B1 * | 9/2004 | Jouppi et al. | 370/394 |
| 6,799,276 B1 * | 9/2004 | Belissent | 726/14 |
| 6,807,542 B2 | 10/2004 | Bantz et al. | |
| 6,829,649 B1 * | 12/2004 | Shorey et al. | 709/235 |
| 6,848,028 B1 | 1/2005 | Sugumar et al. | |
| 6,862,616 B1 | 3/2005 | Tompkins | |
| 6,868,539 B1 | 3/2005 | Travison et al. | |
| 6,871,344 B2 | 3/2005 | Grier et al. | |
| 6,871,345 B1 | 3/2005 | Crow et al. | |
| 6,880,086 B2 | 4/2005 | Kidder et al. | |
| 6,883,168 B1 | 4/2005 | James et al. | |
| 6,895,506 B1 | 5/2005 | Abu-Husein | |
| 6,912,520 B2 | 6/2005 | Hankin et al. | |
| 6,930,984 B1 * | 8/2005 | Nomura et al. | 370/254 |
| 6,938,005 B2 | 8/2005 | Iverson et al. | |
| 6,950,523 B1 | 9/2005 | Brickell et al. | |
| 6,961,341 B1 * | 11/2005 | Krishnan | 370/412 |
| 6,981,070 B1 | 12/2005 | Luk et al. | |
| 6,986,133 B2 | 1/2006 | O'Brien et al. | |
| 6,996,599 B1 | 2/2006 | Anders et al. | |
| 7,000,230 B1 | 2/2006 | Murray et al. | |
| 7,035,943 B2 | 4/2006 | Yamane et al. | |
| 7,055,027 B1 | 5/2006 | Gunter et al. | |
| 7,058,607 B1 | 6/2006 | Miyawaki et al. | |
| 7,131,111 B2 | 10/2006 | Passanisi | |
| 7,143,143 B1 | 11/2006 | Thompson | |
| 7,243,226 B2 | 7/2007 | Newcombe et al. | |
| 2002/0029244 A1 | 3/2002 | Suzuki et al. | |
| 2002/0035526 A1 | 3/2002 | Kutaragi et al. | |
| 2002/0059408 A1 * | 5/2002 | Pattabhiraman et al. | 709/223 |
| 2002/0075844 A1 * | 6/2002 | Hagen | 370/351 |
| 2002/0083178 A1 | 6/2002 | Brothers | |
| 2002/0150253 A1 | 10/2002 | Brezak et al. | |
| 2002/0165026 A1 | 11/2002 | Perkins et al. | |
| 2002/0166117 A1 | 11/2002 | Abrams et al. | |
| 2002/0172222 A1 * | 11/2002 | Ullmann et al. | 370/468 |
| 2003/0009365 A1 | 1/2003 | Tynan et al. | |
| 2003/0039211 A1 * | 2/2003 | Hvostov et al. | 370/230 |
| 2007/0038759 A1 * | 2/2007 | Hanson et al. | 709/227 |

FOREIGN PATENT DOCUMENTS

| | | |
|---|---|---|
| EP | 1150207 | 10/2001 |
| GB | 2348721 | 10/2000 |
| WO | 0161486 | 8/2001 |

OTHER PUBLICATIONS

Rajiv Jauhari et al.: "Priority-Hints: An Algorithm for Priority-Based Buffer Management," Proceedings of the 16th VLDB Conference, Brisbane, Australia, 1990, pp. 708-721.

* cited by examiner

METHOD AND SYSTEM FOR CONTROLLING BANDWIDTH ON CLIENT AND SERVER

RELATED APPLICATION

This application is a Utility Patent application based on a previously filed U.S. Provisional Patent application, U.S. Ser. No. 60/341,079 filed on Dec. 12, 2001, the benefit of the filing date of which is hereby claimed under 35 U.S.C. §119(e).

BACKGROUND

In the past, when a user desired to use new software, the user was required to go to a store, purchase the software, and install the software on the user's computer. If after the software was shipped, a bug was found, the user might be required to go to the vendor's website, find where a patch could be obtained, and download and apply the patch.

Today, some software is distributed over the Internet. If the software can be packaged in a small executable, a software vendor may choose to distribute the software over the Internet. Using this model, a user can browse to a vendor's Website, pay for software, and then download the software. This model has problems when the software requires a lot of disk space or when the user has an Internet connection with relatively low bandwidth. For example, with a computer with a 28.8 kilobits per second (Kbs) to the Internet, a CD's worth of software (650 Megabytes) would take over 50 hours to download. Even with a 512 Kbs connection, downloading 650 Megabytes of software would take almost three hours—assuming that the connection remained up and delivered its full bandwidth.

The overall bandwidth of the Internet, however, continues to increase. In addition, increasingly more consumers are obtaining higher bandwidth connections to the Internet. Software developers and vendors would like to distribute their software directly to the consumers, but some problems remain.

One problem is how to distribute the software economically. For example, some Internet bandwidth providers charge a monthly fee based on peak bandwidth consumed at any time during the month. When a game or other software product is first released, millions of users might try to simultaneously download content associated with the game. This could cause a sharp peak in bandwidth usage and a consequently expensive monthly fee.

Other problems also exist that need to be addressed before software developers and distributors use the Internet to distribute full-scale software products.

SUMMARY

A method and system for controlling bandwidth used to communicate between at least one client and a server is provided. A history is accessed that includes information about communications between the at least one client and a server during a period of time. The history is employed to determine a send time at which a message could be sent without exceeding a bandwidth threshold. The bandwidth threshold indicates an upper limit for an amount of bandwidth allowed during a period of time to communicate between the at least one client and the server. A data structure is then modified to delay sending the message until at least the send time.

In one aspect of the invention, the bandwidth threshold applies to communications to each client in a set of clients, such that the bandwidth threshold is exceeded if bandwidth employed in communicating with any one client of the set of clients exceeds the bandwidth threshold.

In another aspect of the invention, another history is accessed that includes information about aggregate communications during another period of time. The aggregate communications include data that is sent to any client from a server during the period of time. The other history is employed to determine whether a message can be communicated immediately without exceeding an aggregate bandwidth threshold. The aggregate bandwidth threshold indicates an upper limit for bandwidth allowed when sending the aggregate data. If the message cannot be sent immediately without exceeding the aggregate bandwidth threshold, sending of the message is delayed. The other history and the first history may cover an identical time range.

In another aspect of the invention, another bandwidth threshold may apply to communications between the server and each client in another set of clients.

In one aspect of the invention, the information about communications includes values indicating each time a communication occurred and values indicating how many bytes were communicated each time the communication occurred. An average value corresponding to the bandwidth employed during the period of time may be calculated and included in the information.

In another aspect of the invention, the data structure that is modified to delay sending a message is modified by initiating an atomic instruction. Once the atomic instruction is initiated, the atomic instruction completes before the atomic instruction is initiated again. Initiating the atomic instruction may avoid the use of a mutex in modifying the data structure. The atomic instruction may be one of interlocked increment and interlocked decrement.

In one aspect of the invention Win32 input/output (I/O) completion ports ports are employed to activate at least one thread that drives a state machine that sends messages to an interface for sending to at least one client.

In another aspect of the invention, a connection manager is configured to employ at least a portion of a bandwidth of a client when the connection manager is enabled. At least the portion of the bandwidth is employed to download content from at least one server. The bandwidth is allocated to download content, first to any active application that is requesting content the client lacks and second to one or more inactive applications based on priorities assigned to the inactive applications.

In one aspect of the invention, upon receipt of a request for content from an active application, wherein the client lacks the content requested from the active application, preloading content for an inactive application is suspended. Upon completion of downloading the content requested from the active application, preloading content for the inactive application is resumed.

In another aspect of the invention, the connection manager is disabled and employs none of the bandwidth of the client while disabled. The portion of the bandwidth may be a percentage of bandwidth available to the client or may be a percentage of bandwidth left over after user required bandwidth has been satisfied. The portion of the bandwidth employed may vary according to a schedule.

According to another aspect of the invention, a system is disclosed that operates substantially according to the aspects described above.

DETAILED DESCRIPTION

In the following detailed description of exemplary embodiments of the invention, reference is made to the accompanied drawings, which form a part hereof, and which are shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined by the appended claims.

In the following description, first an environment in which the invention may be practiced is described. Encryption and decryption principles that may be used by embodiments of the invention are then discussed. Then, client throttling mechanisms are described. Next, server throttling mechanisms are discussed. Finally, methods for throttling bandwidth are described.

Illustrative Operating Environment

Figure 1:
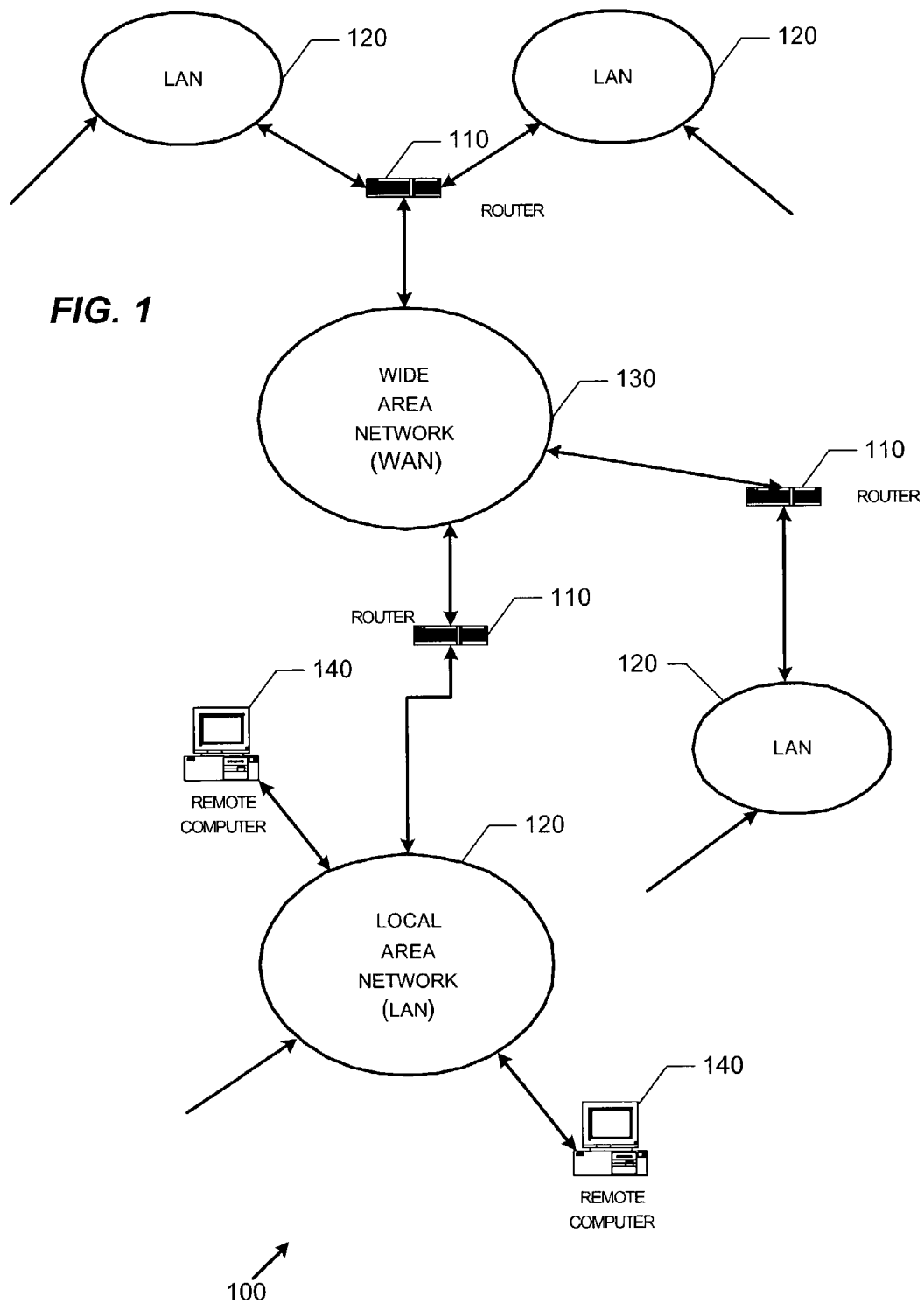
FIGS. 1-3 show components of an exemplary environment in which the invention may be practiced.
Figure 2:
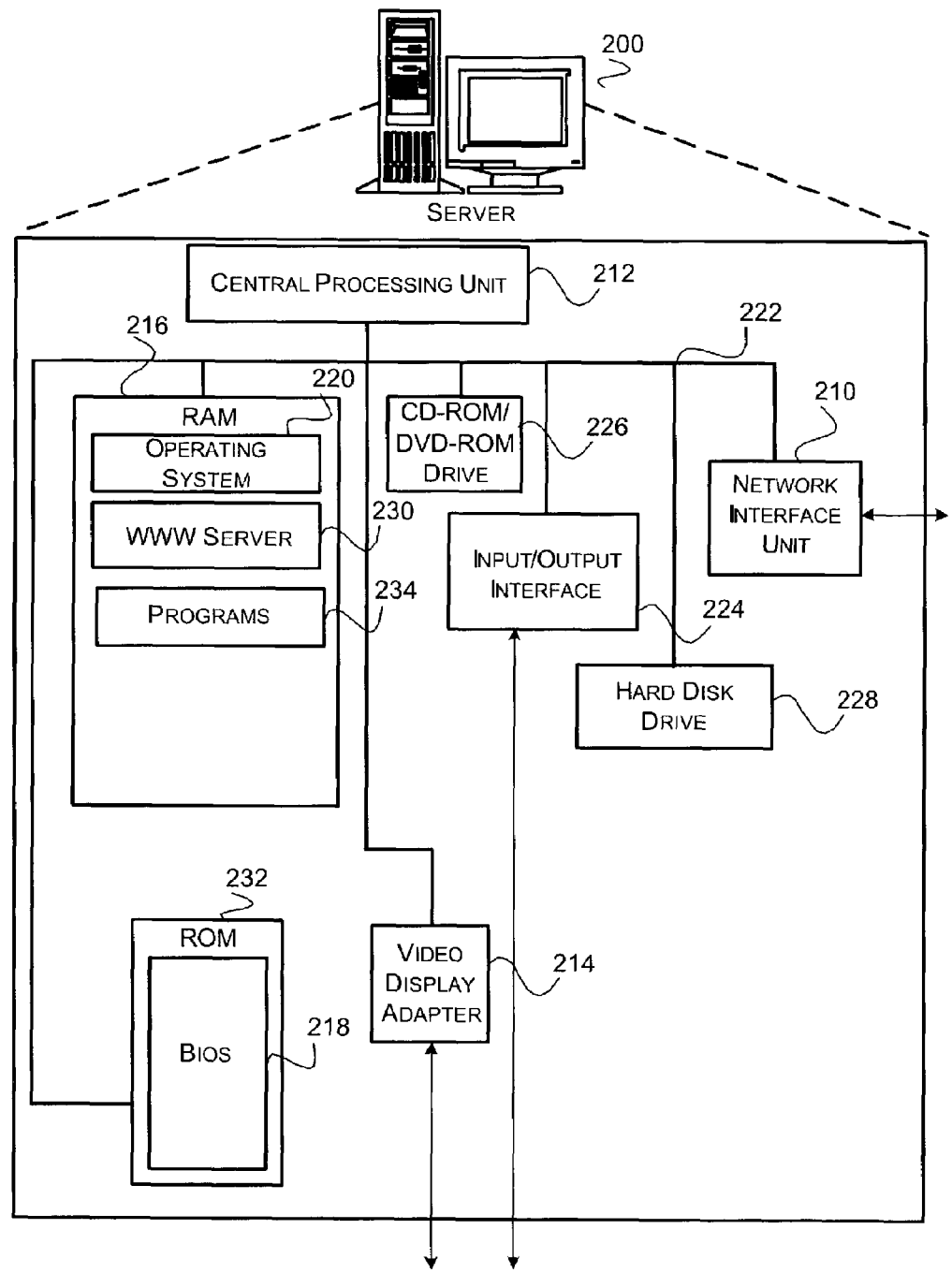
Figure 3:
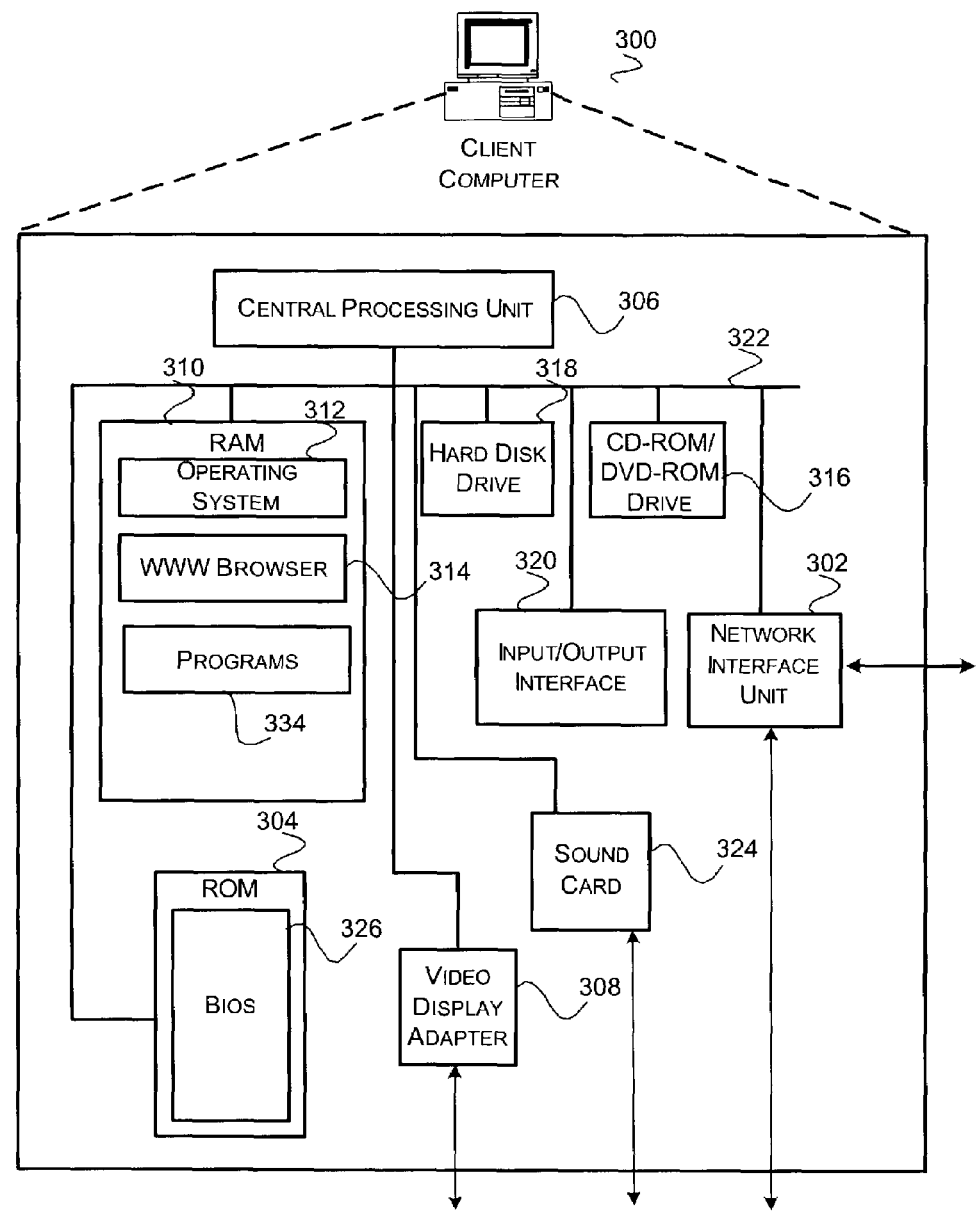

FIGS. 1-3 show components of an exemplary environment in which the invention may be practiced. Not all of the components may be required to practice the invention, and variations in the arrangement and type of the components may be made without departing from the spirit or scope of the invention.

FIG. 1 shows a plurality of local area networks ("LANs") 120 and wide area network ("WAN") 130 interconnected by routers 110. Routers 110 are intermediary devices on a communications network that expedite message delivery. On a single network linking many computers through a mesh of possible connections, a router receives transmitted messages and forwards them to their correct destinations over available routes. On an interconnected set of LANs—including those based on differing architectures and protocols—, a router acts as a link between LANs, enabling messages to be sent from one to another. Communication links within LANs typically include twisted pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, or other communications links known to those skilled in the art. Furthermore, computers, such as remote computer 140, and other related electronic devices can be remotely connected to either LANs 120 or WAN 130 via a modem and temporary telephone link. The number of WANs, LANs, and routers in FIG. 1 may be increased or decreased arbitrarily without departing from the spirit or scope of this invention.

As such, it will be appreciated that the Internet itself may be formed from a vast number of such interconnected networks, computers, and routers. Generally, the term "Internet" refers to the worldwide collection of networks, gateways, routers, and computers that use the Transmission Control Protocol/Internet Protocol ("TCP/IP") suite of protocols to communicate with one another. At the heart of the Internet is a backbone of high-speed data communication lines between major nodes or host computers, including thousands of commercial, government, educational, and other computer systems, that route data and messages. An embodiment of the invention may be practiced over the Internet without departing from the spirit or scope of the invention.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

The Internet has recently seen explosive growth by virtue of its ability to link computers located throughout the world. As the Internet has grown, so has the World Wide Web (WWW). Generally, the WWW is the total set of interlinked hypertext documents residing on HTTP (hypertext transport protocol) servers around the world. Documents on the WWW, called pages or Web pages, are typically written in HTML (Hypertext Markup Language) or some other markup language, identified by URLs (Uniform Resource Locators) that specify the particular machine and pathname by which a file can be accessed, and transmitted from server to end user using HTTP. Codes, called tags, embedded in an HTML document associate particular words and images in the document with URLs so that a user can access another file, which may literally be halfway around the world, at the press of a key or the click of a mouse. These files may contain text (in a variety of fonts and styles), graphics images, movie files, media clips, and sounds as well as Java applets, ActiveX controls, or other embedded software programs that execute when the user activates them. A user visiting a Web page also may be able to download files from an FTP site and send messages to other users via email by using links on the Web page.

A server, such as the server shown in FIG. 2, may provide a WWW site, be a content server, a game server, an authentication server, etc. When providing Web pages, the server may have storage facilities for storing hypertext documents for a WWW site and running administrative software for handling requests for the stored hypertext documents. A hypertext document normally includes a number of hyperlinks, i.e., highlighted portions of text which link the document to another hypertext document possibly stored at a WWW site elsewhere on the Internet. Each hyperlink is associated with a URL that provides the location of the linked document on a server connected to the Internet and describes the document. Thus, whenever a hypertext document is retrieved from any WWW server, the document is considered to be retrieved from the WWW. As is known to those skilled in the art, a WWW server may also include facilities for storing and transmitting application programs, such as application programs written in the JAVA programming language from Sun Microsystems, for execution on a remote computer. Likewise, a WWW server may also include facilities for executing scripts and other application programs on the WWW server itself.

A user may retrieve hypertext documents from the WWW via a WWW browser application program located on a wired or wireless device. A WWW browser, such as Netscape's NAVIGATOR® or Microsoft's INTERNET EXPLORER®, is a software application program for providing a graphical user interface to the WWW. Upon request from the user via the WWW browser, the WWW browser accesses and retrieves the desired hypertext document from the appropriate WWW server using the URL for the document and HTTP. HTTP is a higher-level protocol than TCP/IP and is designed specifically for the requirements of the WWW. HTTP is used to carry requests from a browser to a Web server and to transport pages from Web servers back to the requesting browser or client. The WWW browser may also retrieve application programs from the WWW server, such as JAVA applets, for execution on a client computer.

FIG. 2 shows an exemplary server that may operate to provide a WWW site, other content, and/or services, among other things. When providing a WWW site, server 200 transmits WWW pages to the WWW browser application program executing on requesting devices to carry out this process. For instance, server 200 may transmit pages and forms for receiving information about a user, such as address, telephone number, billing information, credit card number, etc. Moreover, server 200 may transmit WWW pages to a requesting device that allow a consumer to participate in a WWW site. The transactions may take place over the Internet, WAN/LAN 100, or some other communications network known to those skilled in the art.

Those of ordinary skill in the art will appreciate that server 200 may include many more components than those shown in FIG. 2. However, the components shown are sufficient to disclose an illustrative environment for practicing the present invention. As shown in FIG. 2, server 200 is connected to WAN/LAN 100, or other communications network, via network interface unit 210. Those of ordinary skill in the art will appreciate that network interface unit 210 includes the necessary circuitry for connecting server 200 to WAN/LAN 100, and is constructed for use with various communication protocols including the TCP/IP protocol. Typically, network interface unit 210 is a card contained within server 200.

Server 200 also includes processing unit 212, video display adapter 214, and a mass memory, all connected via bus 222. The mass memory generally includes random access memory ("RAM") 216, read-only memory ("ROM") 232, and one or more permanent mass storage devices, such as hard disk drive 228, a tape drive (not shown), optical drive 226, such as a CD-ROM/DVD-ROM drive, and/or a floppy disk drive (not shown). The mass memory stores operating system 220 for controlling the operation of server 200. It will be appreciated that this component may comprise a general purpose server operating system as is known to those of ordinary skill in the art, such as UNIX, LINUX™, or Microsoft WINDOWS NT®. Basic input/output system ("BIOS") 218 is also provided for controlling the low-level operation of server 200.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory may also store program code and data for providing a WWW site. More specifically, the mass memory may store applications including WWW server application program 230, and programs 234. WWW server application program 230 includes computer executable instructions which, when executed by server 200, generate WWW browser displays, including performing the logic described above. Server 200 may include a JAVA virtual machine, an SMTP handler application for transmitting and receiving email, an HTTP handler application for receiving and handing HTTP requests, JAVA applets for transmission to a WWW browser executing on a client computer, and an HTTPS handler application for handling secure connections. The HTTPS handler application may be used for communication with an external security application to send and receive sensitive information, such as credit card information, in a secure fashion.

Server 200 also comprises input/output interface 224 for communicating with external devices, such as a mouse, keyboard, scanner, or other input devices not shown in FIG. 2. Likewise, server 200 may further comprise additional mass storage facilities such as optical drive 226 and hard disk drive 228. Hard disk drive 228 is utilized by server 200 to store, among other things, application programs, databases, and program data used by WWW server application program 230. For example, customer databases, product databases, image databases, and relational databases may be stored.

FIG. 3 depicts several components of client computer 300. Those of ordinary skill in the art will appreciate that client computer 300 may include many more components than those shown in FIG. 3. However, it is not necessary that those conventional components be shown in order to disclose an illustrative embodiment for practicing the present invention. As shown in FIG. 3, client computer 300 includes network interface unit 302 for connecting to a LAN or WAN, or for connecting remotely to a LAN or WAN. Those of ordinary skill in the art will appreciate that network interface unit 302 includes the necessary circuitry for such a connection, and is also constructed for use with various communication protocols including the TCP/IP protocol, the particular network configuration of the LAN or WAN it is connecting to, and a particular type of coupling medium. Network interface unit 302 may also be capable of connecting to the Internet through a point-to-point protocol ("PPP") connection or a serial line Internet protocol ("SLIP") connection as known to those skilled in the art.

Client computer 300 also includes BIOS 326, processing unit 306, video display adapter 308, and memory. The memory generally includes RAM 310, ROM 304, and a permanent mass storage device, such as a disk drive. The memory stores operating system 312 and programs 334 for controlling the operation of client computer 300. The memory also includes WWW browser 314, such as Netscape's NAVIGATOR® or Microsoft's INTERNET EXPLORER® browsers, for accessing the WWW. It will be appreciated that these components may be stored on a computer-readable medium and loaded into memory of client computer 300 using a drive mechanism associated with the computer-readable medium, such as a floppy disk drive (not shown), optical drive 316, such as a CD-ROM/DVD-ROM drive, and/or hard disk drive 318. Input/output interface 320 may also be provided for receiving input from a mouse, keyboard, or other input device. The memory, network interface unit 302, video display adapter 308, and input/output interface 320 are all connected to processing unit 306 via bus 322. Other peripherals may also be connected to processing unit 306 in a similar manner.

As will be recognized from the discussion below, aspects of the invention may be embodied on server 200, on client computer 300, or on some combination thereof. For example, programming steps may be contained in programs 334 and/or programs 234.

In this disclosure, references will be made to client and server. Where appropriate, client should be construed to refer to a process or set of processes that execute on one or more electronic device, such as client computer 300 of FIG. 3. A client is not limited, however, to running on a client computer. It may also run on a server, such as WWW server 200 or be distributed among various electronic devices, wherein each device might contain one or more processes or routines that together constitute a client application. Where appropriate, client should be construed, in addition or in lieu of the discussion above, to be a device upon which one or more client processes execute, for example, client computer 300 or WWW server 200.

Similarly, server should be construed to refer to a process or set of processes that execute on one or more electronic devices, such as WWW server 200. Like a client, a server is not limited to running on a server computer. Rather, it may also execute on what would typically be considered a client computer, such as client computer 300 of FIG. 3, or be distributed among various electronic devices, wherein each device might contain one or more processes or routines that together constitute a server application. Where appropriate, server should be construed, in addition or in lieu of the discussion above, to be a device upon which one or more server processes execute, for example, server 200 or client computer 300.

Encryption and Decryption

Throughout this disclosure, references to encryption and decryption are made. Where appropriate, each reference to an algorithm used to perform encryption or decryption should be construed to include any other algorithm or technique for making it more difficult to obtain the original bytes (also called plaintext) of an application, component of an application, and/or data. For each reference to an algorithm used to perform encryption or decryption throughout this disclosure, it should also be recognized that other embodiments of the invention may be implemented using other encryption algorithms, including the proposed Advanced Encryption Standard (AES) which is Rijndael, RSA Labs Inc.'s (hereinafter "RSA's") RC6, IBM's MARS, TwoFish, Serpent, CAST-256, International Data Encryption Algorithm (IDEA), Data Encryption Standard (DES), Triple DES, DES-EDE2, DES-EDE3, DESX, DES-XEX3, RC2, RC5, Blowfish, Diamon2, TEA, SAFER, 3-WAY, GOST, SHARK, CAST-128, Square, Skipjack, Panama, ARC4, SEAL, WAKE, Sapphire II, BlumBlumShub, RSA, DSA, ElGamal, Nyberg-Rueppel (NR), BlumGoldwasser, Rabin, Rabin-Williams (RW), LUC, LUCELG, ECDSA, ECNR, ECIES, ECDHC, ECMQVC, and/or any other encryption algorithm. These encryption algorithms may use, where appropriate, cipher block chaining mode, cipher feedback mode, CBC ciphertext stealing (CTS), CFB, OFB, counter mode, and/or any other block mode. Other exemplary "encryption" techniques that may be used by embodiments of the invention include compiling source code into binary code, and/or using proprietary data structures to send data. In one embodiment of the invention, Crypto++v4.x, an open-source class library of cryptographic techniques, the source code of which is hereby incorporated by reference, may be used in encrypting or decrypting applications and/or data. Other encryption and decryption libraries, both open source, commercial, and/or proprietary may be used without departing from the spirit or scope of the invention.

In one embodiment of the invention, for symmetric encryption and decryption 128-bit keys and the proposed-AES Rjindael cipher may be used in cipher block chaining mode. Random initialization vectors (IVs) may be sent in plaintext. In another embodiment to protect a password stored on a client, 256-bit Rjindael in cipher feedback mode is used with a random IV. In other embodiments of the invention, other symmetric encryption algorithms (such as the ones listed in the previous paragraph) may be used for symmetric encryption and decryption.

In one embodiment of the invention, for asymmetric encryption, 1024-bit keys may be used with RSA. These keys may be formatted according to the "OAEP (with SHA1)" scheme provided by RSA, or any other formatting appropriate. For example, RSA may be used in conjunction with a ticket (which is described in more detail below) to decrypt data in the ticket to recover an AES key that may then be used to decrypt other portions of a ticket. SHA1 stands for secure hash algorithm 1. SHA1 is a cryptographic hash algorithm that produces a 160-bit hash value from an arbitrary length string. In other embodiments of the invention other private key/public key encryption algorithms may be used (such as the ones listed above) with the same or different key sizes.

In another embodiment of the invention, a server and/or client may also employ a 128-bit HMAC (hashed message authentication code) and/or 1024-bit RSA digital signatures to assist in authenticating that the contents of a ticket have not been changed and/or in authenticating a client and/or server. The 128-bit HMAC may use SHA1 to create a digest of data. For example, contents of a ticket may be fed into a one way hashing function, such as SHA1, to create a block of binary digits. The hashing function may be such that whatever is inputted into it is hashed into fixed length of bits. For example, the hashing function may return 160 bits whether it operates on 4 bytes of data or on all the text in the Bible. A RSA signature may be created and/or formatted as described in RSA's PKCS #1 v2.0, or any other suitable format.

Encryption may be used to protect tickets in a somewhat similar fashion to the Kerberos open protocol from the Massachusetts Institute of Technology (MIT), which is hereby incorporated by reference. Embodiments of the invention that may be used to protect tickets and authenticate clients and/or servers are described below.

Keys may be distributed using 1024-bit RSA and a 128-bit Rjindael symmetric session key. The 1024-bit RSA key may be used to encrypt the 128-bit Rjindael symmetric key. The 128-bit Rjindael key may be used to encrypt the body of a message. To recover a message body, a receiver may use its private RSA key to obtain the 128-bit Rjindael key. Then the 128-bit Rjindael key may be used to decrypt the body of the message. Tickets may include other encrypted 128-bit Rjindael session keys that are sent from one server to another server in a somewhat similar manner to that described in the open Kerberos protocol from MIT.

Encrypted or unencrypted messages or tickets may be sent using TCP/IP, UDP, SSL, IPSEC, or any other networking protocol. Content sent to or from content servers may be encrypted or unencrypted. Random numbers may be generated by any random number generator. An exemplary random number generator that may be used is CryptoAPI, produced by Microsoft Corporation of Redmond, Wash.

It will be recognized that the key sizes given above are illustrative. In other embodiments of the invention, key sizes other than or in addition to the key sizes above may be used when encrypting data and/or authenticating a server, client, or user.

Client Side Throttling

Figure 4:
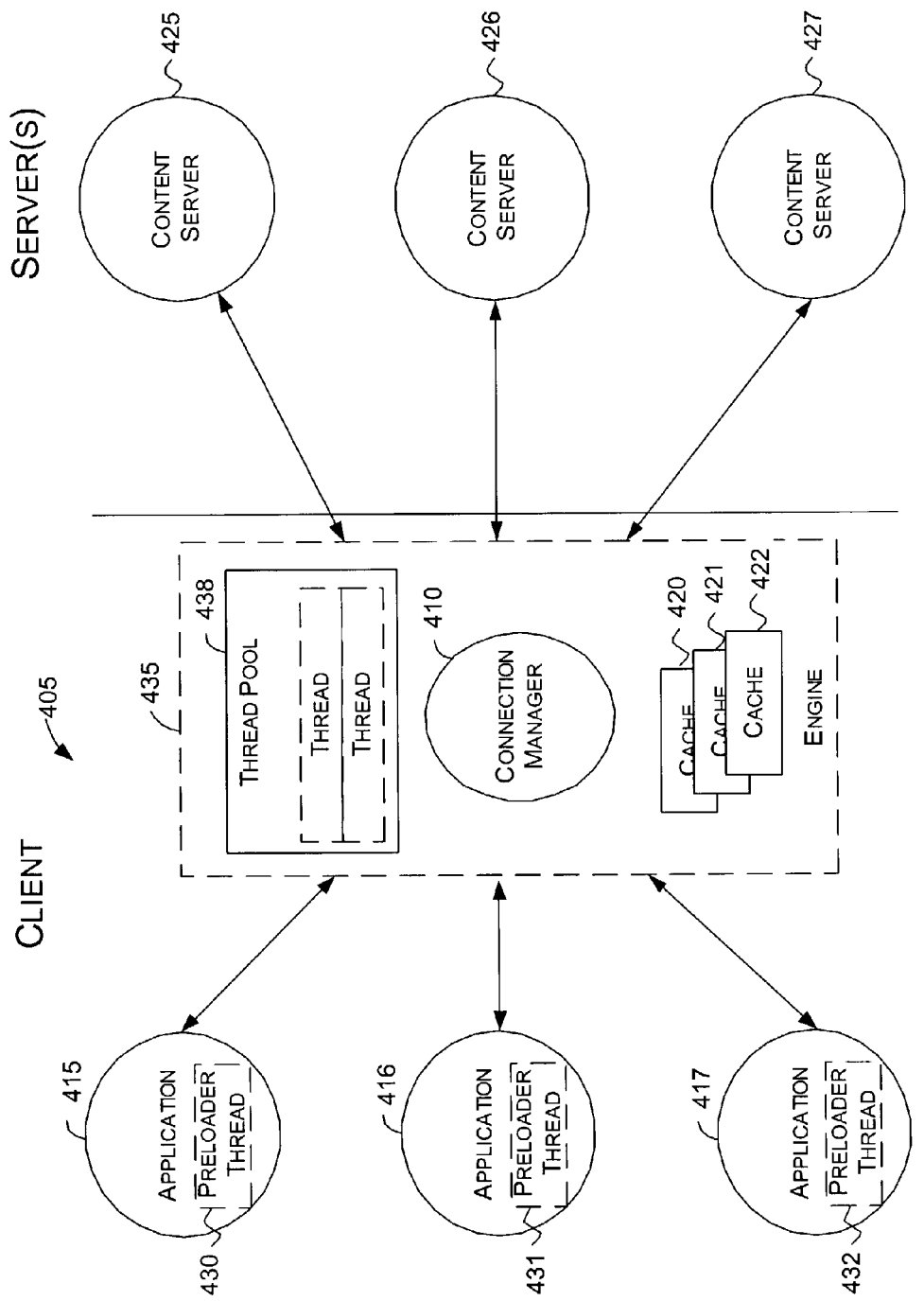
FIG. 4 shows a client and one or more servers arranged in an exemplary configuration for practicing the invention.

FIG. 4 shows a client and one or more servers arranged in an exemplary configuration for practicing the invention. Client 405 may include connection manager 410 and one or applications, such as applications 415-417. Each application may be associated with one or more caches, such as caches 420-422. In another embodiment of the invention, all of the applications are associated with a single cache. That is, a single cache may store content for more than one application. The caches may be stored on a computer-readable medium located on client 405 or easily accessible by client 405, such as on a server coupled by a LAN to client 405.

Content may be divided into one or more resources. In one sense, a resource is anything a program requires or needs to continue or complete execution. A program itself may be divided into a plurality of resources. When a client computer first requests an application, such as a game, the resources of the game may be located solely on a content server. The executable code and data that comprises the application may both be divided into blocks. Each of these blocks could be considered a resource needed by the application to continue or complete execution.

Some of the blocks of executable code of the application may be downloaded from the server and stored on the client computer. After a sufficient number of blocks are downloaded, the application may start executing with the blocks that are currently available on the client computer. Before or when the application comes to a part in the code in which it needs code located on the content server, the application may request a block of code containing the needed code. This block of code would be a resource needed by the application to continue or complete execution.

A resource includes such things as a particular portion of a file. A resource may be identified by information including the name of the file together with an offset in the file and bytes requested. The file may be a data file, a dynamic link library, an executable program, a component, and the like. Resources may also include such things as a processor, memory, a printer, a display adapter, a network adapter, a storage device such as a hard disk, CD-ROM, DVD disk, or other optical disk, and the like, although it will be recognized that these devices would not be downloaded from a content server to a client computer.

Client 410 is coupled by a WAN/LAN (not shown) to one or more servers, such as servers 425-427. FIG. 1 shows a WAN/LAN, i.e. WAN/LAN 100, suitable for coupling client 410 to the one or more servers. It will be recognized that any network, including the Internet, would also be suitable for coupling client 410 to the one or more servers.

In one embodiment of the invention, each application is associated with a preloader thread. For example, application 415 may be associated with preloader thread 430. Preloader thread 430 is in charge of obtaining content that application 415 currently needs or will shortly need. Preloader thread 430 may know which content application 415 will shortly need by examining a static resource list previously generated. For example, application 415 may be instrumented to output a list of which resources it accesses during a sample execution. Application 415 may be executed several times under varying circumstances to obtain a representative or constructed list of resources typically needed by application 415.

When application 415 is using resources that are currently available on client 415, preloader thread 430 may request resources from the static resource list to be retrieved from a content server. As requested resources are received, they may be stored in a cache associated with application 415, such as cache 420. Then, when application 415 requires the resource, it may be retrieved from a computer storage medium locally accessible rather than a content server.

When application 415 requires a resource that is not locally accessible on client 415, application 415 may utilize preloader thread 430 or may directly request the resource from engine 435. After the resource is retrieved, it may then be stored in a cache associated with application 415. In addition, the resource may then be provided to application 415 for use.

In another embodiment of the invention, each application (415-417) requests content directly from engine 435. According to this embodiment, an application informs engine 435 of its current status. In response to the status, engine 435 requests any resources that are needed by the application. These resources may be sent to the application or may be stored in a cache. Engine 435 may manage a thread pool (438) that contains threads that are associated with the applications.

Connection manager 410 may be used to manage the retrieval of resources from one or more content servers. For example, connection manager 410 may receive requests for resources from one or more applications, such as applications 415-417, or preloader threads, such as preloader threads 430-432. Connection manager 410 may also operate on user configuration data. For example, a user may configure connection manager 410 to use no more than a particular percentage of available bandwidth the computer has to the Internet. The user may select that between 9 a.m. and 5 p.m. connection manager 410 may use a maximum of, for example, 15% of a client 405's available bandwidth to the Internet, while between 5 p.m. and 9 a.m., i.e. during the night, the client process may have 75% or more of client 405's available bandwidth.

The bandwidth available to connection manager 410 may vary as the user engages in different activities. For example, when a user is not utilizing the Internet, 100% of the Internet bandwidth may be available to connection manager 410. If connection manager 410 is configured to use 25% of the available bandwidth, connection manager 410 may during this time use 25% of the total bandwidth available to client 405 to the Internet. At other times, the user may be surfing the Web. During these times, amount of bandwidth required by a user may vary. If, at a particular time, the user is using 50% of the total available bandwidth available from client 405 to access the Internet, a connection manager configured to use 25% of the available bandwidth would use 25% of the 50% remaining, i.e., 12.5% of the total available bandwidth.

Alternatively, a connection manager may be configured to use a percentage of total bandwidth available to the Internet. For example, the configuration manager may be configured to use 50% of the total bandwidth available to the Internet. While it is actively obtaining resources, the configuration manager may attempt to consume 50% of the total bandwidth available, regardless of what percentage of the bandwidth the user is currently using.

A connection manager may be enabled or disabled. Enabling and disabling may be done automatically or by a user. For example, at times a user may require all of the computational and bandwidth resources of their computing device. In a graphical user interface environment, the user may select an icon associated with the connection manager and disable the connection manager. Doing so may automatically disable preloader threads associated with applications. Alternatively, or in addition, a user may set times in which the connection manager may preload data and may also set how much computational and bandwidth resources the connection manager may consume throughout a schedule. A schedule may assign the same computational and bandwidth resources for certain days, e.g. during working days one schedule may apply, and be different for other days, e.g., during weekends a different schedule may apply. A schedule for a connection manager's consumption of computational and bandwidth resources may be intricate and detailed, simple, or of any type imaginable without departing from the spirit or scope of the invention.

In an embodiment of the invention, a user may enable preloading files for certain applications and/or priorities between the applications. For example, in adjusting priorities of preloading between applications, the user may assign a particular portion of the bandwidth available to one application and another portion of the bandwidth available to another application. Throughout this document, where it makes sense, bandwidth may relate to both CPU compute cycles and the rate at which a client can send data to and receive data from a local area network or wide area network, such as the Internet.

In another embodiment of the invention, when the user assigns priorities between preloading resources for applications, the resources for the highest priority application are preloaded first. Then, the resources for the next highest priority application are preloaded, and so on.

In another embodiment of the invention, instead of preloading resources from highest priority to lowest priority, resources are preloaded simultaneously for all applications. Based on user configuration, for example, connection manager 410 may calculate how much bandwidth each application is allowed in preloading resources. Preloading resources in this manner may occur when no application is active and actively requesting resources.

When an application becomes active and actively requests resources, connection manager 410 may suspend preloading resources for non-active applications and devote all available bandwidth that has been allotted by a user to connection manager 410 to retrieve resources for the active application. The application may also request resources and place them in a cache associated with the application.

It will be recognized that connection manager 410 can perform client side throttling. In particular, when no preloader threads are active, connection manager 410 can retrieve content from content servers according to user-set parameters. When preloader threads are active, connection manager 410 may still govern the bandwidth available to the preloader threads.

In one embodiment of the invention, connection manager 410 is integrated with an application. That is, when only one application is executing, it may not be necessary to have connection manager 410 managing connections from multiple applications. Rather, its functionality may be included in an application.

Connection manager 410 may have one or more connections to content servers 425-427. In some embodiments of the invention, a single content server, such as content server 426, has sufficient bandwidth to service the needs of multiple clients. In other embodiments of the invention, multiple content servers may be required to service the needs of one or more clients. A connection manager that determines that it needs the bandwidth of more than one content server may open connections to more than one content server to obtain content.

Connection manager 410 may have more than one connection to one content server. For example, connection manager 410 may request content for more than one application at a time. The content may all reside on one content server, such as content server 426. Connection manager 410 may open one connection for content for each application.

More preferably, however, connection manager 410 maintains only one connection with each content server which has content connection manager 410 is requesting. Despite some added complexity in multiplexing content through one connection, this has added benefits in minimizing the number of connections to a content server. Those skilled in the art will recognize that a content server may have a limited number of connections it can service. If every connection manager from every client were to open multiple connections to each content server, these limited connections might be rapidly consumed.

In addition, connection manager 410 may close a connection when the connection is not being used. This may also help the connection capacity of content servers.

Content servers 425 are any servers that can serve content. An exemplary device capable of serving content is server 200 of FIG. 2 configured with appropriate hardware and software.

Figure 5:
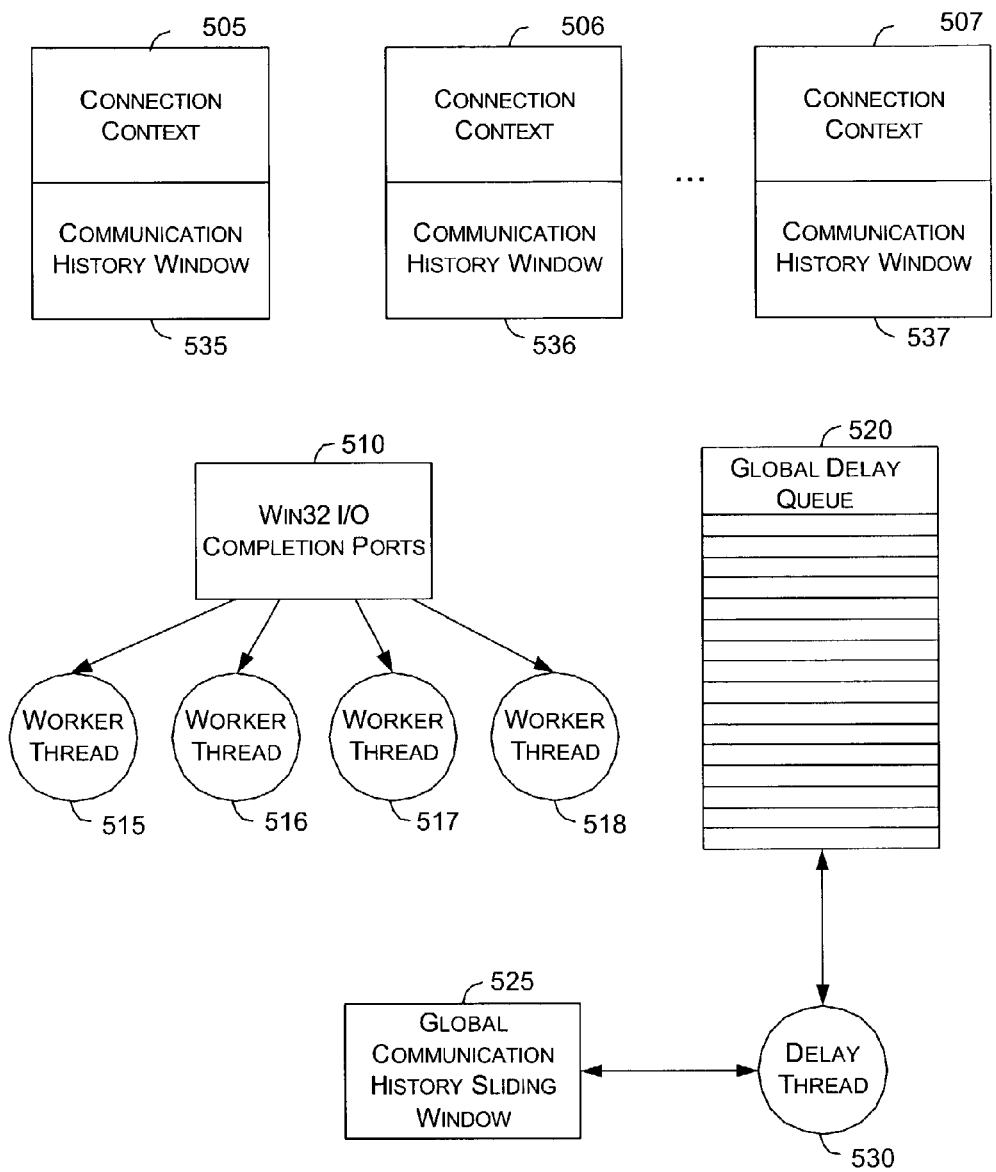
FIG. 5 shows exemplary components and data structures usable by a server for throttling bandwidth.

FIG. 5 shows exemplary components and data structures usable by a server for throttling bandwidth. The components and data structures include connection contexts 505-507, Win32 input/output (I/O) completion ports 510, worker threads 515-518, global delay queue 520, global communication history sliding window 525, and delay thread 530.

Win32 I/O completion ports 510 is a mechanism provided by some Microsoft® Windows® operating systems. Without delving into too many details, Win32 I/O completion ports 510 provides a mechanism for efficiently processing requests. Having too many or too few server threads processing client requests can lead to performance degradation. Some architectures spawn a new thread for each client request received. With a sufficient number of client requests, this may cause thrashing. Some architectures have a single thread to service all client requests. This may result in poor performance if, for example, the thread blocks while waiting for an event to complete.

To maximize performance a server should have as few as possible context switches while at the same time having as many threads as needed to exploit parallelism and blocked threads. As long as a thread is actively executing, the thread should be allowed to service as many outstanding requests as possible. When the thread blocks, another thread should be awoken that services threads until it blocks. If the other thread blocks and the first thread is available, the first thread should be awoken to process requests until it blocks. This avoids unnecessary swapping.

Win32 I/O completion ports 510 provides such a mechanism in an efficient manner in part because it is implemented as part of an operating system's kernel. As events occur, data regarding the event is placed in a queue. An event might be, for example, receiving a request from a client or the completion of sending data to a client.

If no worker threads are active, at least one is awoken to service any requests in the queue. (Two threads might be awoken in a dual-processor system, depending on a concurrency value set by a software developer.) If a worker thread blocks and the queue is not empty, another worker thread is awoken to operate on data in the queue. If a worker thread completes an operation it first looks to see if the queue is empty. If the queue is not empty, the worker thread grabs another item from the queue and begins processing it. If the queue is empty, the worker thread sleeps until it is awoken as a result of an item being placed in the queue.

Four worker threads, worker threads 515-518, are shown in FIG. 5. The value four may be chosen as a concurrency value of potential worker threads for a dual processor system. Other values may also be chosen to maximize performance depending on a configuration of a server.

When activated, a worker thread, such as worker thread 515, pulls (or receives) data from a queue maintained by Win32 I/O completion ports 510. The data may include, for example, a connection handle that identifies a connection together with an event that occurred, such as data was received from a client. The worker thread may call a handler to service the event. For example, the worker thread may call a procedure that represents a state machine that processes requests from clients. The handler may use the data from the queue to identify a connection context, such as connection context 505.

A connection context includes information regarding a connection with a client. For example, connection context 505 may include communication history window 535. Communication history window 535 may include, for example, a history of data sent to and received from a client for a period (or window) of time. This data may be used to calculate the average bandwidth consumed for the period of time included in the window for communications with the client.

Bandwidth data may also be determined from other sources and methods. For example, statistics about bandwidth may be able to be obtained from operating systems, other programs bandwidth usage information, from a socket layer, and the like.

Each client may be assigned a maximum amount of bandwidth. This number may be uniform across all clients or may be vary. For example, a client who purchases a premium subscription may be given a greater amount of bandwidth than a client who purchases a normal subscription.

If sending a message to a client will cause a maximum amount of bandwidth allotted to the client to be exceeded, the handler may calculate how long the message should be delayed so as not to exceed the bandwidth allotted. After making the calculation, the handler may place an entry in the global delay queue that indicates the earliest point at which the message should be sent to the client.

After processing an event, the handler may return processing to the worker thread. The worker thread may then check to see if any other data in the Win32I/O completion ports queue needs to be processed. In one embodiment of the invention, the handler is part of the worker thread and resides in the process space of the worker thread. In another embodiment of the invention, the handler is outside the process space of the worker thread. In some embodiments of the invention, the worker thread and the handler are part of the same thread of execution.

Global delay queue 520 is a queue that maintains data regarding when data should be sent to one or more clients. The queue may be implemented as a circular buffer that includes pointers to indicate the head and the tail of the queue. Each slot in the queue may correspond to a millisecond or other slice in time.

Each slot in the queue is capable of indicating that one or more chunks of data should be sent to a client at the associated time. Each slot in the queue may itself be a queue of items to send at the time associated with the slot. Ideally, the memory for the queue and each slot is pre-allocated to avoid locking that might occur when dynamically allocating from a heap.

Each time slot in the queue may include a list of pointers to data that should be sent when the time slot occurs. Microsoft® Windows® Winsock API allows a pointer to the data to be passed to it. Upon receipt of a pointer to data and other relevant information, the Winsock API can send the data to its destination. This avoid unnecessary copying of the data.

To access global delay queue 520, it is preferred to avoid the use of a mutual exclusion object ("mutex"). In operation, the queue may be accessed by multiple threads. A mutex is avoided by using atomic instructions. Atomic instructions are instructions that once initiated will complete before a context switch takes place. Two such instructions available on Windows® 32 bit operating systems are interlocked increment and interlocked decrement. These instructions can be used to ensure that the threads accessing the queue do not interfere with each other.

For example, when placing data into the queue, a thread can call interlocked increment to increment a pointer that indicates where the tail of the data is. This reserves a place in the queue in which to place data. If the thread is interrupted before it makes the interlocked call, when it awakes, it will still operate in a proper fashion. That is, even if another thread incremented the pointer while the thread was asleep, when the thread awakes, it will increment the pointer again and reserve memory in which to operate. Because it is an atomic instruction, the thread cannot be interrupted during the interlocked call. Thus, provided that the code is written correctly to write in the memory it has reserved, the thread will write in memory that is has reserved without using a mutex to access the memory.

Global delay queue 520 may be arranged with each time slot being other than one millisecond without departing from the spirit or scope of the invention. Global delay queue 520 may also be arranged to include any preset number of time slots (constrained by available memory) without departing from the spirit or scope of the invention.

Global communication history sliding window 525 includes data that can be used to calculate the average total bandwidth consumed on a server. This average total bandwidth is the bandwidth consumed by each of the individual connections, such as the connections associated with connection contexts 505-507. Upstream and downstream bandwidth consumed may be tracked separately or together. Alternatively, only upstream or downstream bandwidth may be tracked.

The data in global communication history sliding window 525 may be used, among other things, to determine whether a maximum bandwidth for an entire server will be exceeded by sending data. Global communication history sliding window 525 acts as a check to ensure that the maximum bandwidth is not exceeded. Using the data in global communication history sliding window 525, a program can calculate when it can send data without exceeding the maximum bandwidth. It will be recognized that the maximum bandwidth may be configured by a network administrator or some other person and may be different on different servers.

The maximum bandwidth may even be different for the same server when the same server is providing content associated with two products. For example, an Internet service provider may provide a server to multiple vendors, each of which provide content to clients. Each vendor may run a separate instance of the mechanism outlined above on the server. Each instance may be allotted a maximum bandwidth. Each instance may be configured to use no more than its allotted maximum bandwidth.

Figure 6:
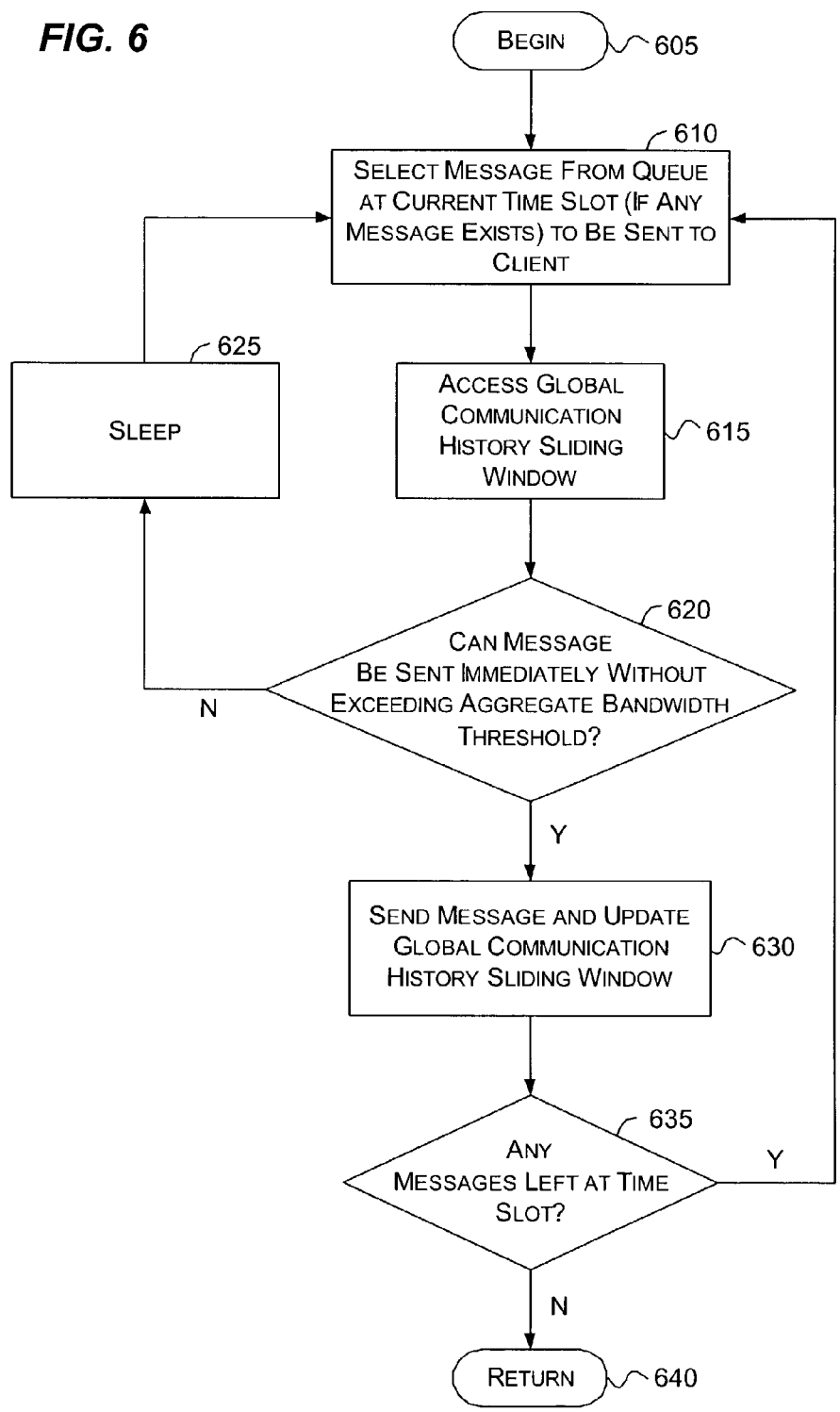
FIG. 6 shows a flowchart illustrating an exemplary method for throttling bandwidth consumed on a server.

Delay thread 530 operates on data included in global delay queue 520 and global communication history sliding window 525. The purpose of delay thread 530 is to delay sending data to keep within per-client limits and a per-server limit. An exemplary algorithm which delay thread 530 may use to fulfill this purpose is illustrated in FIG. 6.

Briefly, delay thread 530 accesses the data in global communication history sliding window 525. If this data indicates that more data can be sent without exceeding a server bandwidth limit, delay thread may increment a pointer on global delay queue 520 and determines whether there is any data to send in the associated time slot. If there is, the data is sent and global communication history sliding window 525 is updated. If not, delay thread may sleep for a period of time.

If the data in global communication history sliding window 525 indicates that the server is approaching or at its bandwidth limit, delay thread 530 (or another thread) may begin degrading performance for each connection to a client. In addition, or alternatively, connections to clients may be dropped. For example, clients with a non-premium subscription may be dropped when a server approaches or is at its bandwidth limit. Dropping connections may also be determined with how long the server has been at its bandwidth limit.

Flow Charts

FIG. 6 shows a flowchart illustrating an exemplary method for throttling bandwidth consumed on a server. The process begins at block 605 when a delay thread, such as delay thread 630, is ready to determine whether any messages should be sent. After block 605, processing continues at block 610.

At block 610, a message to be sent to a client is selected from a queue. The queue may be a queue within global delay queue of FIG. 6. As described previously, each time slot in global delay queue may itself include a queue of messages that could be sent at that time. It is possible that no messages will be queued to be sent at a particular time slot. In this case, the process shown in FIG. 6 may simply return to a calling process. If one or more messages do exist at the time slot, however, a message is selected and processing continues at block 615.

At block 615, a global communication history sliding window is accessed. The global communication history sliding window may indicate, for example, that the aggregate bandwidth of all data sent to clients over a period of time is approaching a selected upper limit. The global communication history sliding window may include information about data sent such as when each data was sent and how many bytes were sent in each data. This information may be used to calculate whether the selected message can be immediately sent without exceeding the selected upper limit. Bandwidth can be calculated by dividing the amount of data sent by the time period in which the data was sent. For example, if 100 megabits were sent in 5 seconds, bandwidth to send the bits could be calculated by dividing 100 megabits by 5 seconds to arrive at 20 megabits per second. For example, referring to FIG. 5, delay thread 530 accesses global communication history sliding window 525 to obtain data regarding bandwidth consumed by messages sent to clients over a window of time. After block 615, processing continues at block 620.

At block 620, a determination is made as to whether the selected message can be sent immediately without exceeding the aggregate bandwidth threshold. If the message can be sent immediately, processing continues at block 630; otherwise, processing continues at block 625. It will be recognized that messages are not transmitted instantaneously. Rather, "sent immediately" refers to initiating a process of sending the selected message. After the process is initiated, it still takes time to send the message. For example, it takes some time for the message to propagate through a protocol stack to be placed on a wire. It also takes time for the message to travel over a finite bandwidth link. For example, to send 100 megabits over a 100 megabit-per-second (Mbs) connection requires a minimum of 1 second assuming ideal circumstances, e.g., no overhead, etc.

At block 625, the delay thread sleeps. The delay thread may sleep to allow a time to pass before checking to see whether a message can be sent without exceeding an aggregate bandwidth limit. When sleeping, the delay thread may leave queues as they are. When the delay thread awakes, it may resume with the message it was considering before the delay thread was caused to sleep. After block 625, processing continues at block 610.

At block 630, the message is sent and the global communication history sliding window is updated. The global communication sliding window may be updated to include information regarding the recently sent message. For example, referring to FIG. 5, delay thread 530 passes a pointer included in global delay queue 520 to a Winsock API. The Winsock API uses the pointer to access a buffer and sends data in the buffer to a destination. After block 630, processing continues at block 635.

At block 635 a determination is made as to whether any messages corresponding to the time slot still need to be sent. If there are one or more messages remaining, processing continues at block 610; otherwise, processing continues at block 640.

At block 640, processing returns to a calling process. At this point at least one message in a queue at a current time slot has been selected to be sent to one or more clients. A global communication history sliding window has been accessed to determine whether the message should be delayed before being sent. If so, a delay thread has slept; otherwise, the message has been sent and the global communication history sliding window updated. The process shown in FIG. 6 may be repeated each time a thread, such as delay thread 530 awakes and examines a queue for messages to send.

Figure 7:
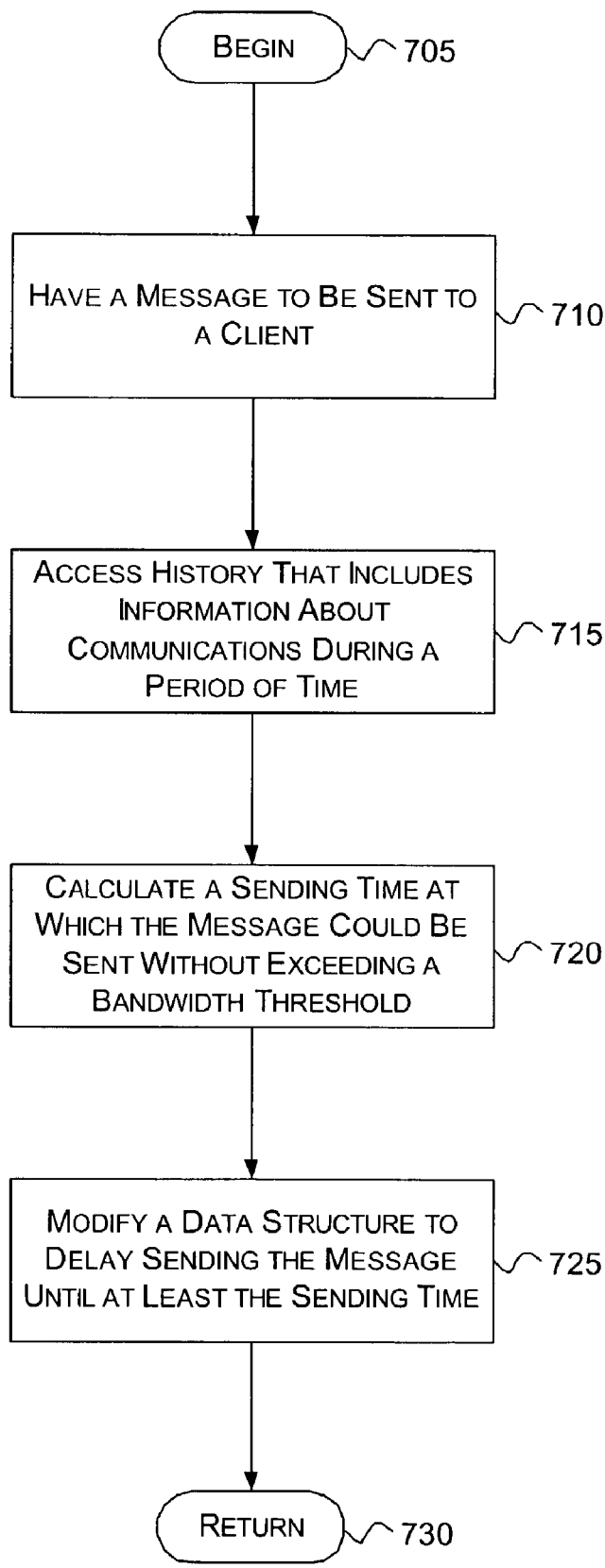
FIG. 7 shows a flowchart illustrating an exemplary method for delaying sending of messages.

FIG. 7 shows a flowchart illustrating an exemplary method for delaying sending of messages. The process begins at block 705 when a handler is ready to be called with a message to send to a client. The handler could be called by a worker thread, such as worker thread 515 of FIG. 5. After block 705, processing continues at block 710.

At block 710, the handler is given a message to be sent to a client. The handler may be given just a pointer to the message or it may be given other information such as a handle to a connection context. For example, referring to FIG. 5, a handler called by worker thread 515 may be given a handle to connection context 505 together with information that indicates that a message should be delivered to a client associated with connection context 505. After block 710, processing continues at block 715.

At block 715, a history is accessed that includes information about communications during a period of time. For example, referring to FIG. 5, communication history window 535 may be accessed to obtain information about communications previously sent over the connection associated with connection context 505. This information may include values indicating each time a communication was sent in a sliding window of time and values indicating how many bytes were sent at each time a communication was sent in the sliding window of time. After block 715, processing continues at block 720.

At block 720, a sending time is calculated at which the message could be sent without exceeding a bandwidth threshold. For example, assume that the bandwidth consumed over the history window was uniformly 50 megabits per second. Further assume that the message is 10 megabits. Also assume that a server sending the message can only send the message at 100 megabits per second. Further assume that the window is 10 seconds long. Finally, assume that the bandwidth threshold is 60 megabits per second. Using these numbers it would take at least $1/10^{th}$ of a second to send the message. If you were to drop the first $1/10^{th}$ of a second of the window, you would only have 500 megabits−5 megabits=495 megabits over 9.9 seconds. If you were then to add the 10 megabits (assuming it was transmitted in $1/10^{th}$ second), you would then have 505 megabits over 10 seconds. The bandwidth consumed over the last ten seconds for the 505 megabits would be $505/10=50.5$ megabits per second. As this is less than the bandwidth threshold of 60 megabits per second, the message could be immediately sent.

Those of skill in the art will recognize that calculating a time to send the message will depend greatly on the maximum bandwidth at which the server can send a message, the amount of time used for the window, and the length of the message to send. Obtaining precise control over bandwidth consumed may involve taking into account one or more of the above parameters. After block 720, processing continues at block 725.

At block 725, a data structure is modified to delay sending the message until at least the sending time. For example, referring to FIG. 5 the handler may make an entry in global delay queue 520 that indicates the earliest time that the message should be sent. For the example above, the handler may specify that no delay is needed before sending the message. This may be done, for example, by placing a pointer in the queue at the next time slot that will be looked at. After block 725, processing continues at block 730.

At block 730, processing returns to a calling process. At this point, a history has been accessed that includes information about data sent over a period of time. A sending time was calculated at which the message could be sent without exceeding a bandwidth threshold. Then, a data structure was modified to delay sending the message until at least the sending time. This process may be repeated for each message that is to be sent to a client.

The various embodiments of the invention may be implemented as a sequence of computer implemented steps or program modules running on a computing system and/or as interconnected machine logic circuits or circuit modules within the computing system. The implementation is a matter of choice dependent on the performance requirements of the computing system implementing the invention. In light of this disclosure, it will be recognized by one skilled in the art that the functions and operation of the various embodiments disclosed may be implemented in software, in firmware, in special purpose digital logic, or any combination thereof without deviating from the spirit or scope of the present invention.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for controlling bandwidth used to communicate between at least one client and a server, comprising:
   (a) accessing a history that includes information about communications between the at least one client and the server during a previous period of time, wherein the information includes values indicating each time a communication was sent in a sliding window of time and values indicating how much data were sent at each time a communication was sent in the sliding window of time;
   (b) employing the history to determine a send time to communicate a message between the at least one client and the server without exceeding a bandwidth threshold, the bandwidth threshold corresponding to an upper limit for an amount of bandwidth allowed during a first period of time to communicate between the at least one client and the server; and
   (c) modifying a data structure to delay communicating the message until at least the send time by modifying a global delay queue that indicates the earliest time the message should be sent, wherein an amount of bandwidth employed during the first period of time for all communications between the at least one client and the server is less than the bandwidth threshold, wherein the message is directed to an application on the at least one client, and wherein the amount of bandwidth allowed is based in part on whether the application is active or inactive on the at least one client and a priority associated with the application, and wherein the amount of allowed bandwidth is adaptively modifiable in real time to consume up to a predetermined portion of the bandwidth currently available to any one client of the at least one client.

2. The method of claim 1, wherein the bandwidth threshold applies to communications between the server and each client in a set of clients, wherein the bandwidth threshold is determined to be exceeded if bandwidth employed by the server in communicating with any one client of the set of clients during the first period of time exceeds the bandwidth threshold.

3. The method of claim 2, further comprising:
   (a) accessing another history that includes information about aggregate communications during a second period of time, the aggregate communications including communications between any client and the server during the second period of time;
   (b) employing the other history to determine whether the message can be communicated immediately without exceeding an aggregate bandwidth threshold, the aggregate bandwidth threshold corresponding to an upper limit for bandwidth allowed for the aggregate communications during the second period of time; and
   c) if the message can not be sent immediately without exceeding the aggregate bandwidth threshold, delaying sending the message.

4. The method of claim 2, wherein another bandwidth threshold applies to communications between the server and each client in another set of clients.

5. The method of claim 2, wherein the bandwidth threshold is exceeded by sending the message at a selected time if sending the message at the selected time would cause an average bandwidth employed in communicating between the at least one client and the server in excess of the bandwidth threshold during the first period of time.

6. The method of claim 1, wherein the information includes values indicating each time a communication occurred in the previous period of time and values corresponding to how much data was communicated each time the communication occurred.

7. The method of claim 1, wherein an average value corresponding to a bandwidth employed for the communications during the first period of time is calculated and included in the information.

8. The method of claim 1, wherein the communications during the first period of time are aggregate communications that include communications between the server and any client during the previous period of time and wherein the bandwidth threshold corresponds to an upper limit for bandwidth employed in the aggregate communications during the first period of time.

9. The method of claim 2, wherein bandwidth employed is computed by dividing a number of bytes communicated during the first period of time by a number of seconds in the first period of time.

10. The method of claim 1, wherein the data structure is modified by initiating an atomic instruction, wherein once the atomic instruction is initiated, the atomic instruction completes before the atomic instruction can be initiated again.

11. The method of claim 10, wherein initiating the atomic instruction avoids the use of a mutex in modifying the data structure.

12. An apparatus for controlling bandwidth used to communicate between at least one client and the apparatus, comprising:
(a) an interface configured to send and receive messages; and
(b) coupled to the interface, a server configured to perform acts, comprising:
(i) accessing a history that includes information about communications between the at least one client and the apparatus during a first period of time, wherein the information includes values indicating each time a communication was sent in a sliding window of time and values indicating how much data were sent at each time a communication was sent in the sliding window of time;
(ii) employing the history to determine a send time to communicate a message between the at least one client and the apparatus without exceeding a bandwidth threshold, the bandwidth threshold corresponding to an upper limit for an amount of bandwidth allowed during a first period of time to communicate between the at least one client and the server; and
(iii) modifying a data structure to delay communicating the message until at least the send time by modifying a global delay queue that indicates the earliest time the message should be sent, wherein an amount of bandwidth employed during the first period of time for all communications between the at least one client and the server is less than the bandwidth threshold, wherein the message is directed by a configuration manager to an application on the at least one client, and wherein the amount of bandwidth allowed is based in part on another amount of the bandwidth used by another application on the at least one client, wherein the other application is unmanaged by the configuration manager, and wherein the amount of allowed bandwidth is adaptively modifiable in real time to consume up to a predetermined portion of the bandwidth currently available to any one client of the at least one client.

13. The apparatus of claim 12, wherein the bandwidth threshold applies to communications between the server and each client in a set of clients, wherein the bandwidth threshold is determined to be exceeded if bandwidth employed by the server in communicating with any one client of the set of clients exceeds the bandwidth threshold.

14. The apparatus of claim 13, wherein the server is further configured to perform acts, comprising:
(a) accessing another history that includes information about aggregate communications during a second period of time, the aggregate communications including communications between any client and the server during the second period of time;
(b) employing the other history to determine whether the message can be communicated immediately without exceeding an aggregate bandwidth threshold, the aggregate bandwidth threshold corresponding to an upper limit for bandwidth allowed for the aggregate communications during the second period of time; and
(c) if the message can not be sent immediately without exceeding the aggregate bandwidth threshold, delaying sending the message.

15. The apparatus of claim 14, wherein the first time period and the second time period are for an identical time range.

16. The apparatus of claim 14, wherein Win32 input/output (I/O) completion ports are employed to activate at least one thread that drives a state machine that sends the messages to the interface for sending to the at least one client.

17. The apparatus of claim 12, wherein when the server executes an atomic instruction when modifying the data structure.

18. The apparatus of claim 17, wherein the atomic instruction is one of an interlocked increment instruction and an interlocked decrement instruction.

19. An apparatus for controlling bandwidth used to communicate between at least one client and the apparatus, comprising:
(a) means for sending and receiving messages;
(b) means for storing a history that includes information about communications between the at least one client and the apparatus during a first period of time; wherein the information includes values indicating each time a communication was sent in a sliding window of time and values indicating how much data were sent at each time a communication was sent in the sliding window of time;
(c) means for employing the history to determine a send time to communicate a message between the at least one client and the apparatus without exceeding a bandwidth threshold, the bandwidth threshold corresponding to an upper limit for an amount of bandwidth allowed during a first period of time to communicate between the at least one client and the server; and
(d) means for modifying a data structure to delay communicating the message until at least the send time by modifying a global delay queue that indicates the earliest time the message should be sent, wherein the message is directed to an application on the at least one client, and wherein the amount of bandwidth allowed is based in part on a schedule of a time of day on the at least one client, and based in part on whether the application is active or inactive on the at least one client and a priority associated with the application, and wherein the amount of allowed bandwidth is adaptively modifiable in real time to consume up to a predetermined portion of the bandwidth currently available to any one client of the at least one client.

20. A computer storage media that includes instructions for components for controlling bandwidth used to communicate between a client and a plurality of servers, comprising:
(a) a first component for configuring a connection manager to employ at least a portion of a bandwidth of the client if the connection manager is enabled;
(b) a second component for employing an accessed history to determine a send time to communicate a message between the client and a server of the plurality of servers without exceeding an upper limit for an amount of the bandwidth to download content from the server to the client, wherein the history includes information about communication during a period of time, wherein the information includes values indicating each time a communication was sent in a sliding window of time and values indicating how much data were sent at each time a communication was sent in the sliding window of time;
(c) a third component for delaying communicating the message to download content until at least the send time by modifying a data structure of a global delay queue that indicates the earliest time the message should be sent;
(d) a fourth component for determining another send time to communicate another message between the client and another server of the plurality of servers without exceeding another upper limit for another amount of the bandwidth to download another content from the other server to the client, wherein each of the amount of bandwidth is based on part on whether an application is active or inactive on the client, and wherein the amounts of bandwidth are adaptively modifiable in real time to consume up to a predetermined portion of the bandwidth currently available to any one client of the at least one client; and
(e) a fifth component for delaying communicating the other message to download content until at least the other send time.

21. The computer storage media of claim 20, further comprising another component for allocating the bandwidth to download content in the following order:
(a) first to any active application that is requesting content that the client lacks; and
(b) second to one or more inactive applications based on priorities assigned to the inactive applications.

22. The computer storage media of claim 20, further comprising another component for suspending preloading content for an inactive application upon receipt of a request for content from an active application, wherein the client lacks the content requested from the active application.

23. The computer storage media of claim 22, further comprising another component for resuming preloading content for the inactive application upon completion of downloading the content requested from the active application.

24. The computer storage media of claim 20, wherein the connection manager is disabled and employs none of the bandwidth of the client while disabled.

25. The computer storage media of claim 20, wherein the portion of the bandwidth is a percentage of the bandwidth available to the client.

26. The computer storage media of claim 20, wherein the portion of the bandwidth is a percentage of the bandwidth left over after user required bandwidth has been satisfied.

27. The computer storage media of claim 20, wherein the portion of the bandwidth employed varies according to a schedule.

* * * * *

UNITED STATES PATENT AND TRADEMARK OFFICE
CERTIFICATE OF CORRECTION

| | | |
|---|---|---|
| PATENT NO. | : 7,580,972 B2 | Page 1 of 1 |
| APPLICATION NO. | : 10/317851 | |
| DATED | : August 25, 2009 | |
| INVENTOR(S) | : Paul David Jones et al. | |

It is certified that error appears in the above-identified patent and that said Letters Patent is hereby corrected as shown below:

In column 1, line 29, delete "50hours" and insert -- 50 hours --, therefor.

In column 2, line 39, after "ports" delete "ports".

In column 8, line 17, delete "Rjindael" and insert -- Rijndael --, therefor.

In column 8, line 20, delete "Rjindael" and insert -- Rijndael --, therefor.

In column 8, line 60, delete "Rjindael" and insert -- Rijndael --, therefor.

In column 8, line 61, delete "Rjindael" and insert -- Rijndael --, therefor.

In column 8, line 62, delete "Rjindael" and insert -- Rijndael --, therefor.

In column 8, line 64, delete "Rjindael" and insert -- Rijndael --, therefor.

In column 8, line 65, delete "Rjindael" and insert -- Rijndael --, therefor.

In column 8, line 67, delete "Rjindael" and insert -- Rijndael --, therefor.

In column 13, line 57, delete "Win32I/O" and insert -- Win32 I/O --, therefor.

In column 18, line 56, in claim 3, delete "c)" and insert -- (c) --, therefor.

Signed and Sealed this

Twenty-seventh Day of October, 2009

David J. Kappos
*Director of the United States Patent and Trademark Office*